United States Patent [19]
Giobbi et al.

[11] Patent Number: 5,469,193
[45] Date of Patent: Nov. 21, 1995

[54] CORDLESS POINTING APPARATUS

[75] Inventors: John J. Giobbi, Crown Point, Ind.; David H. Burke, Glenwood, Ill.

[73] Assignee: Prelude Technology Corp., Cedar Lake, Ind.

[21] Appl. No.: 956,408

[22] Filed: Oct. 5, 1992

[51] Int. Cl.$^6$ ............................................. G09G 3/02
[52] U.S. Cl. ............................................. 345/158; 345/157
[58] Field of Search ................... 340/709, 710; 250/571; 345/157, 161, 163, 179, 158, 8; 359/159

[56] References Cited

U.S. PATENT DOCUMENTS

| | | | |
|---|---|---|---|
| 3,403,257 | 9/1968 | Petroff | 359/159 |
| 3,710,122 | 1/1973 | Burcher et al. | 359/159 |
| 4,209,255 | 6/1980 | Heynau et al. | 345/179 |
| 4,550,250 | 10/1985 | Mueller et al. | 345/158 |
| 4,578,674 | 3/1986 | Baker et al. | 345/159 |
| 4,654,648 | 3/1987 | Herrington et al. | 345/179 |
| 4,688,933 | 8/1987 | Lapeyre | 345/173 |
| 4,939,508 | 7/1990 | Lawrence et al. | 345/163 |
| 4,978,861 | 12/1990 | Sabater et al. | 250/571 |
| 5,166,668 | 11/1992 | Aoyagi | 345/180 |

*Primary Examiner*—Richard Hjerpe
*Assistant Examiner*—Vivian Chang
*Attorney, Agent, or Firm*—Wood, Phillips, VanSanten, Clark & Mortimer

[57] ABSTRACT

A cordless peripheral pointing apparatus selects a position for transmission to a processing system. The apparatus comprises a hand-held pointer including a transmitter continually transmitting a through-the-air signal. A fixed base unit is positioned in proximity to the pointer and includes a receiver receiving the through-the-air transmitted signal, a processor for processing the received signal to determine position of the pointer relative to the fixed receiver in response to the received signal, and transmitter for transmitting information representing the determined position to a processing system.

17 Claims, 16 Drawing Sheets

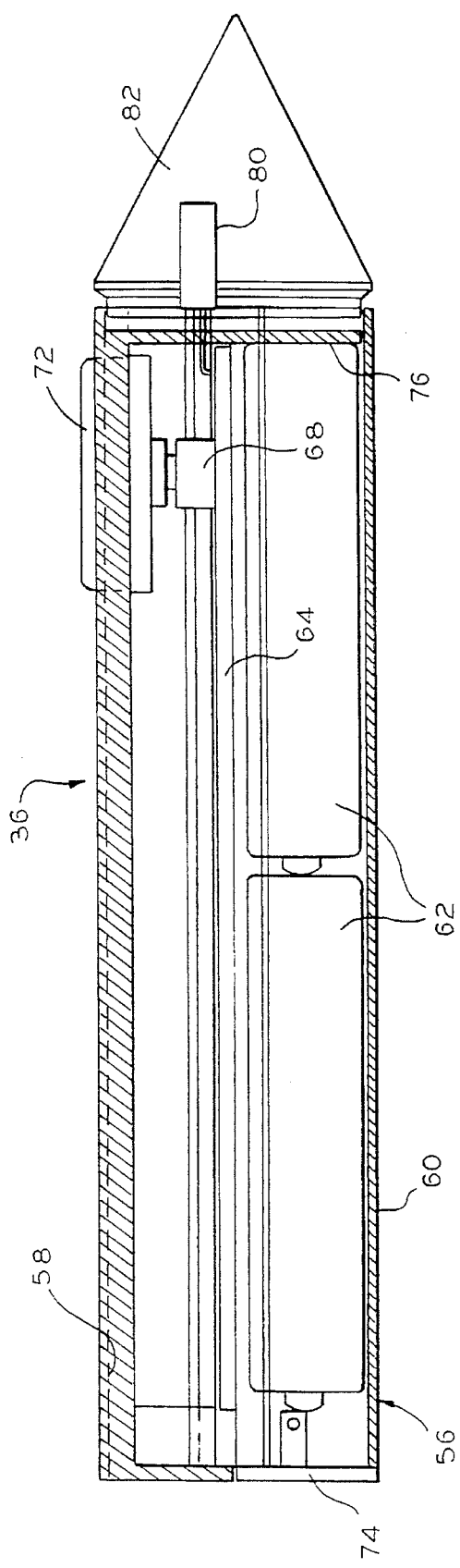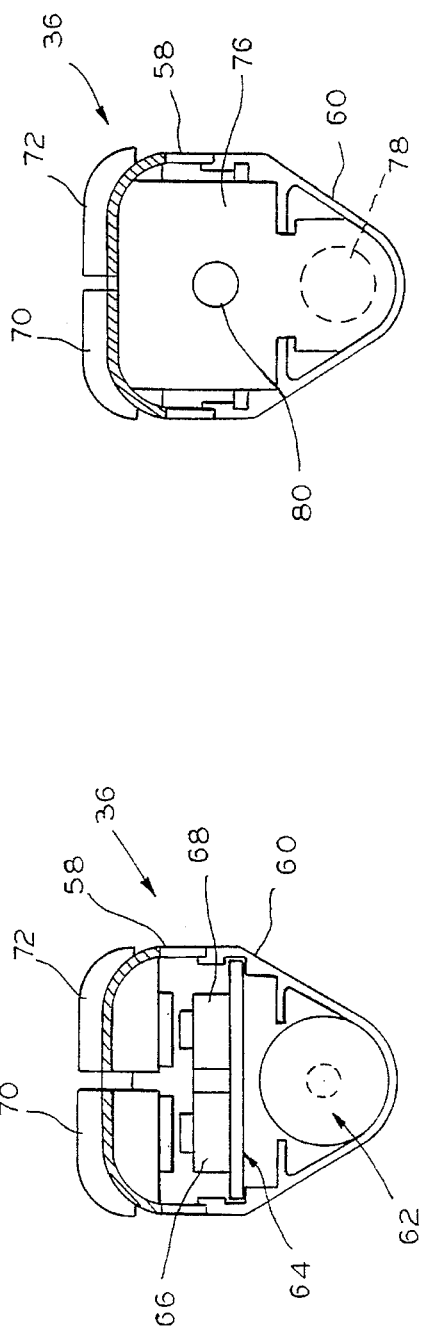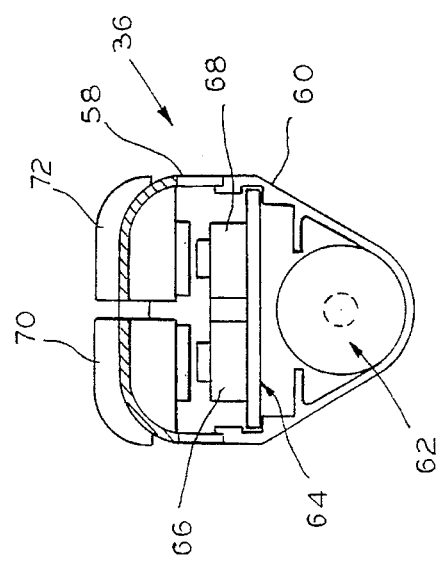

CORDLESS POINTING APPARATUS

FIELD OF THE INVENTION

This invention relates to computer peripheral products and, more particularly, to a cordless pointing apparatus therefor.

BACKGROUND OF THE INVENTION

Personal computer systems have dramatically improved the productivity of users through the continuing development of both hardware systems and software application products. Advantageously, the personal computer system should be simple to use, even for the most unskilled or wary user. The user interface to a personal computer system is most commonly via a display monitor and keyboard. The display monitor displays a text or graphic display suitable to the particular application program being run. The keyboard is used to enter commands or other information into the system.

When operating most programs, a "cursor" is displayed on the monitor to indicate the position on the display at which any data or instructions are to be entered. Initially, cursor control was provided with "arrow" keys on the keyboard, allowing the user to move the cursor in any direction one character or line at a time. More recently, pointing devices have been designed to simplify and provide more efficient cursor control. One such device is known as a light pen which is a light sensitive pickup device that is pointed at a display surface. A more popular recent development is the "mouse". A mouse is moved along a flat surface, with movement being sensed and translated into cursor movement on the display. Each of these devices is connected to the personal computer system with an electrical cord for transmitting electrical signals to the personal computer system. The requirement for the cord restricts what can be done with the mouse when not in use and limits the distance it can be from the system itself. Moreover, a mouse can only provide information indicating a relative change in cursor position from its last position. As a result, it may often be necessary to lift the mouse off of the flat surface and move it to provide additional cursor movement.

The present invention is directed to solving one or more of the problems discussed above.

SUMMARY OF THE INVENTION

In accordance with the invention there is disclosed a cordless peripheral pointing apparatus.

Broadly, there is disclosed herein a peripheral pointing apparatus for selecting a position for transmission to a processing system. The apparatus comprises a hand-held pointer including a transmitter continually transmitting a through-the-air signal. A fixed receiver is positioned in proximity to the pointer and includes a receiver receiving the through-the-air transmitted signal, processing means for processing the received signal to determine position of the pointer relative to the fixed receiver in response to the received signal, and transmission means for transmitting information representing the determined position to a processing system.

It is a feature of the invention that the transmitter transmits an infrared signal.

It is another feature of the invention that the transmitter transmits a modulating signal.

It is an additional feature of the invention that the receiver includes two receive circuits each having a sensor, the two sensors being spaced a select distance apart. Each receive circuit includes means for determining angle of the pointer relative to its associated sensor, and the processing means includes calculation means for calculating position of the pointer using the two determined angles and the select distance.

It is another feature of the invention that each sensor comprises a dual cell sensor and each receive circuit calculates the angle in response to intensity of the signal received at each of the dual cells.

There is disclosed in accordance with another aspect of the invention a peripheral pointing apparatus including a hand-held pointer including a transmitter continually transmitting a through-the-air infrared light signal. A fixed receiver is positioned in proximity to the pointer. The receiver includes first and second sensors each receiving the transmitted light signal. A receive circuit is connected to the sensors for determining angular position of the pointer relative to each of the sensors. A processing means processes the received angular positions to determine a coordinate position of the pointer relative to the fixed receiver. Transmission means transmit information representing the determined coordinate position to a processing system.

It is a feature of the invention that the transmitter comprises a battery-powered transmitter.

It is another feature of the invention to provide a third sensor connected to the receive circuit and the receive circuit calculates angular position of the pointer relative to the third sensor in a plane perpendicular to the plane for the first and second sensors. The processing means in response to the additional angular position calculates a three-dimensional coordinate position of the pointer.

It is another feature of the invention that the pointer comprises a battery for powering the transmitter and further comprising switch means for selectively connecting the battery to the transmitter.

It is an additional feature of the invention to provide means for sensing angular position of the pointer, the sensing means controlling operation of the switch means to selectively connect the battery to the transmitter according to angular position of the pointer.

It is a further feature of the invention that the transmission means comprises a serial interface circuit for transmitting a serial signal to the processing system.

In accordance with a further aspect of the invention there is disclosed a peripheral pointing apparatus including a hand-held pointer including a transmitter continually transmitting a through-the-air infrared modulating light signal. A fixed receiver is positioned in proximity to the pointer. The receiver includes first and second sensors each receiving the transmitted light signal. A receive circuit is connected to the sensors for determining angular position of the pointer relative to each of the sensors. Processing means process the received angular positions to determine a coordinate position of the pointer relative to the fixed receiver. Transmission means transmit information representing the determined coordinate position to a processing system.

It is a feature of the invention that the pointer further comprises a plurality of user actuable switches and the transmitter comprises a first oscillating circuit generating an oscillating signal at a first frequency, a second oscillating circuit generating a second oscillating signal at one of a plurality of different frequencies, different from the first frequency and dependent upon which if any switch is actuated, and means for combining the first and second oscillating signals for generating the modulating light signal.

It is an additional feature of the invention that the receive circuit further comprises a separating circuit for separating the first and second oscillating signals and the processing means processes the second oscillating signal to determine which of the switches is actuated.

Further features and advantages of the invention will be readily apparent from the specification and from the drawing.

BRIEF DESCRIPTION OF THE DRAWINGS

FIG. 5 is a sectional view taken along the line 5—5 of FIG. 4;

FIG. 6 is a sectional view taken along the line 6—6 of FIG. 4;

FIG. 7 is a view similar to that of FIG. 6 with a terminal plate removed;

DETAILED DESCRIPTION OF THE INVENTION

Figure 1:
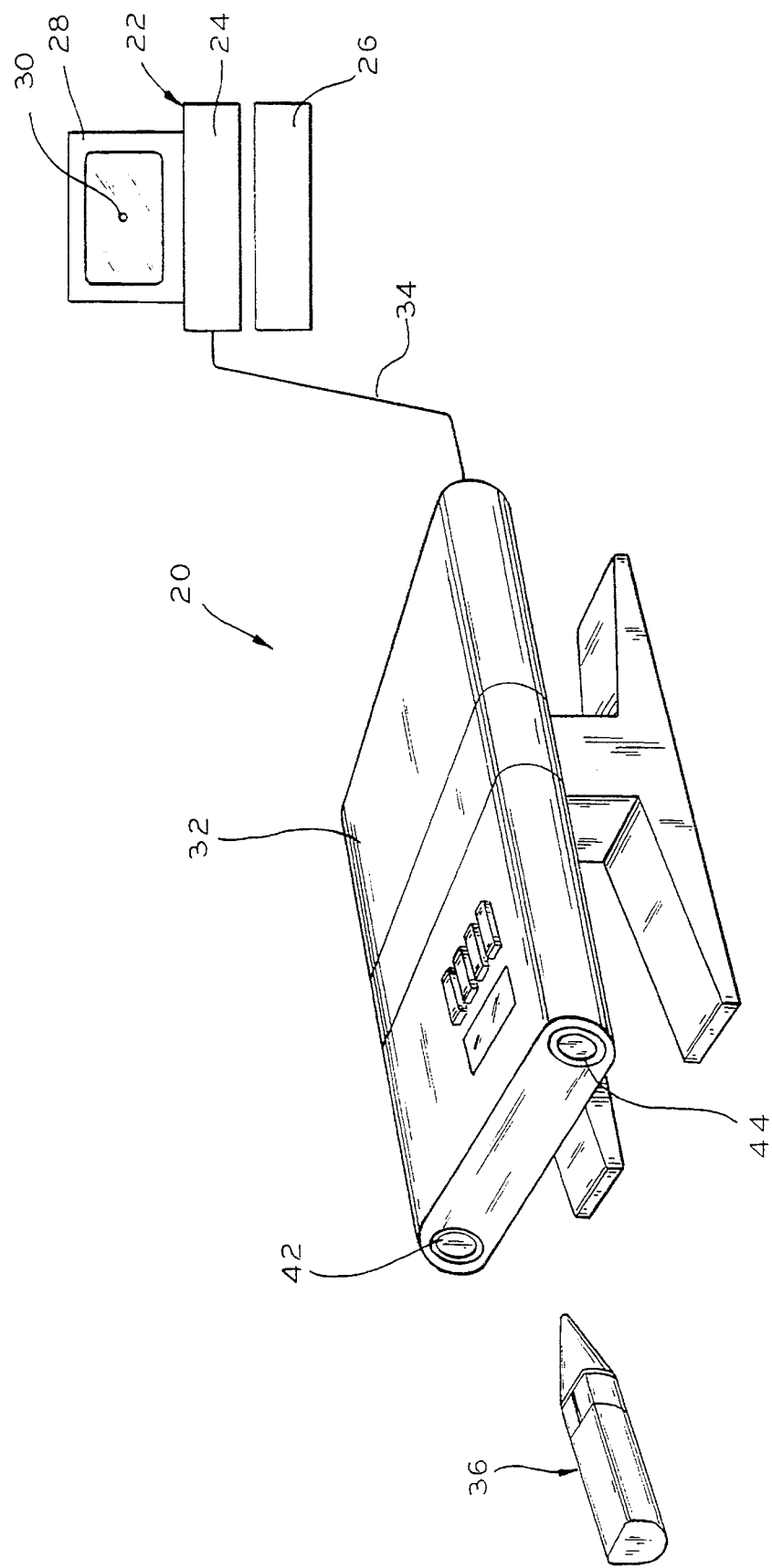
FIG. 1 is a perspective view of the peripheral pointing apparatus according to the invention connected to a personal computer system.

Referring to FIG. 1, a peripheral pointing apparatus 20 is illustrated for connection to a host system, such as a personal computer system 22. The personal computer system 22 may be any typical, commercially available computer system. The illustrated system includes a processor 24 connected to a keyboard 26 and monitor 28. The processor 24 includes suitable memory for storing and implementing programs such as a Disk Operating System and other suitable driver programs. The pointing apparatus 20 is used for selecting desired position of a cursor 30 displayed on the monitor 28. The pointing apparatus 20 is intended to be compatible with software for conventional pointing devices known as a "mouse". More particularly, the pointing apparatus 20 can be used with a personal computer system 22 having a serial communication interface and a mouse drive program, such as for the Microsoft mouse (Microsoft is a registered trademark of Microsoft Corporation).

The pointing apparatus 20 includes a fixed base unit or receiver 32 connected via a cable 34 to a serial port for the processor 24, and a hand-held pointer 36. In accordance with the invention, the pointer 36 comprises a cordless transmitter having no cord extending between the pointer 36 and receiver 32. In accordance with the invention, the receiver 32 is capable of determining the exact position in two or three dimensional space of the pointer 36. The positioning information is processed and transmitted to the processor 24. This information can be used by the processing system 24 as necessary or desired, such as for providing control of position of the cursor 30.

In accordance with the invention, no physical connection is required between the pointer 36 and receiver 32 and no special tablet, pad or screen is required. This system can be used as the basis of a computer input pointing device, such as a conventional pen or mouse, or in many other situations where the exact positioning and/or movement information of an object is required. Also, the pointing apparatus can be used with any processing system for selecting position information.

The pointer 36 emits a modulated, infrared light signal in a narrowly filtered band width. The pointer 36 also contains additional circuitry to modify the modulation of the emitted signal to be used by the receiver 32 to indicate acknowledgement of an event, such as the depressing of a button in an application such as a computer input pointing device. The receiver 32 processes the received information using non-modifiable software and repackages it for transmission to the host system 22 for further processing. The receiver 32 is designed with the capability to mathematically select a desired resolution of position of the pointer 36, as well as the choice of using the device for determining two or three dimensional positioning information and to deliver movement information in either relative or absolute format. The relative format calculates movement of the pointer 36 in relation to the last position it was found to be in. The absolute format calculates exact position of the pointer 36 in relation to the receiver 32. The position and/or movement information can be delivered to the host system in inches, centimeters, pixels, or whatever unit of measurement is desired.

Figure 2:
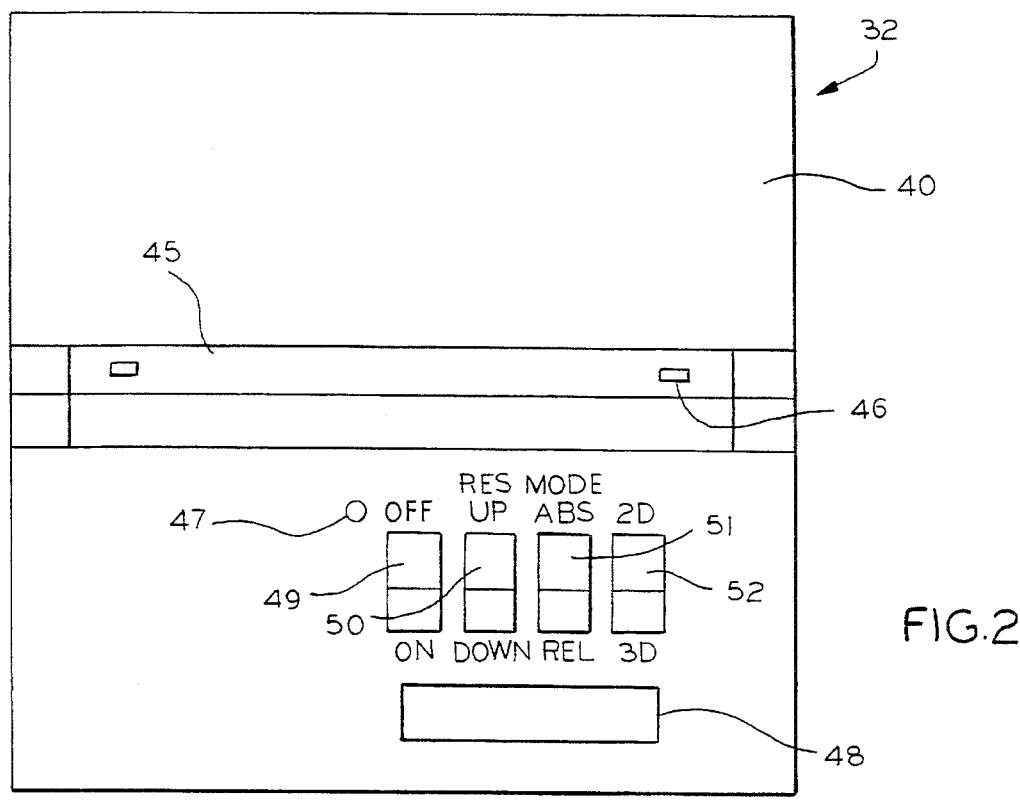
FIG. 2 is a plan view of a receiver for the pointing apparatus of FIG. 1.
Figure 3:
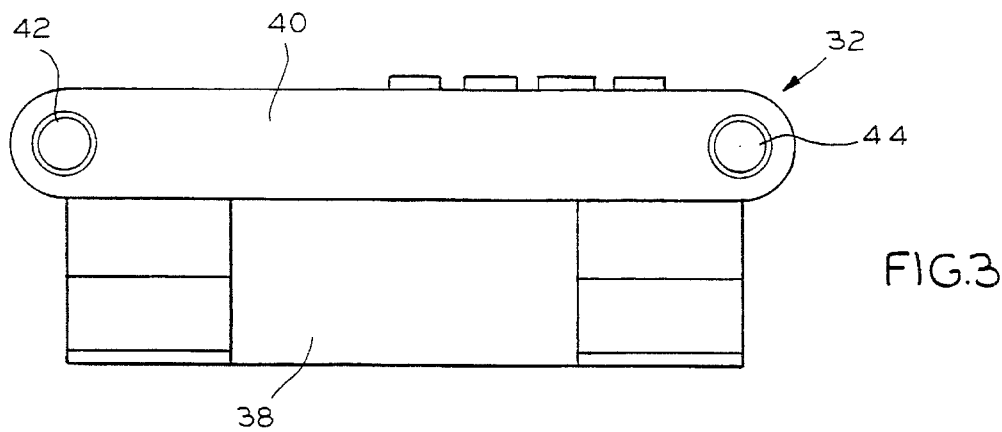
FIG. 3 is a front elevation view of the receiver of FIG. 2.
Figure 4:
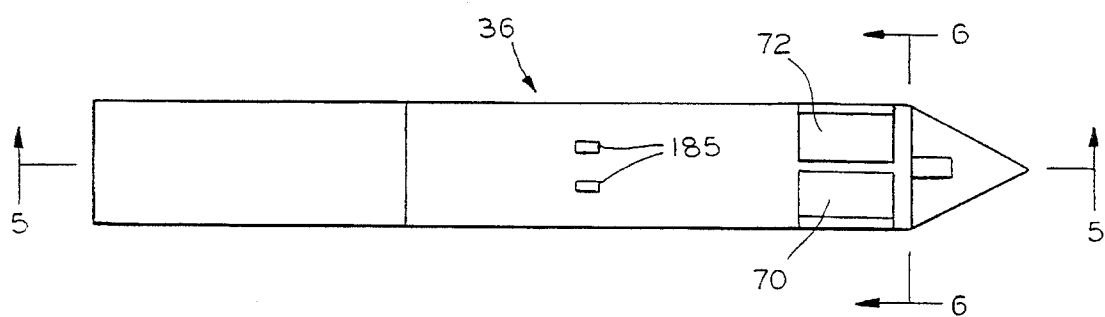
FIG. 4 is a plan view of a pointer for the pointing apparatus of FIG. 1.

With reference to FIGS. 2 and 3, the receiver 32 includes a base 38 supporting a housing 40. In use, the base 38 would be positioned on a desk or other work area, as necessary or desired, with connection to the center processing system 22 via the cable 34, see FIG. 1. The receiver 32 includes two light detecting sensors 42 and 44 located a select distance apart in a generally horizontal plane. Particularly, the first sensor 42 comprises a bicell light sensor, such as from Silicon Detector Corporation, while the second sensor 44 comprises a quad-cell light sensor, such as is also from Silicon Detector Corporation. The bicell 42 includes two light detectors positioned side by side, while the quad-cell 44 includes four light detectors. Also included in the housing 40 are a transmitter recharging trough 45 including recharging contacts 46, a digital display 48 and an indicating light 47. Also provided are an on/off switch 49, an up/down resolution selector 50, an absolute/relative mode selector 51 and a two-dimension/three-dimension selector 52. The display 48 displays selected resolution or sensitivity.

With reference to FIGS. 4–7, the pointer 36 is in the shape of a writing instrument such as a pen. The pointer 36 includes an elongate tubular housing 56 including an upper body 58 and lower body 60. The lower body 60 houses a plurality of batteries 62 for powering the pointer 36. An electrical circuit board 64 is secured in the lower body 60.

In addition to circuit elements discussed below, the circuit board 64 includes a pair of electrical switches 66 and 68 actuated by respective push buttons 70 and 72 extending through suitable openings in the upper body 58. A battery cap 74 closes off a rear end of the lower body 60 providing access for replacing the batteries 62. A front end of the housing 56 is closed off by a sealing rib 76 including a contact plate 78 for providing contact with the batteries 62. Extending from the circuit board 64 through an opening in the sealing rib 76 is an infrared light emitting diode (LED) 80. The LED 80 is enclosed in a translucent cover or tip 82 suitably secured to the housing 60. Although not shown, a reflective material may be included on the outer surface of the sealing rib 76 to improve light transmission.

As described more specifically below, the pointer 36 is selectively positioned in proximity to the receiver 32, as shown in FIG. 1. The LED 80 is continuously modulated, with the light signal being received by the bicell 42 and quad-cell 44. These received signals are then processed to determine position of the pointer 36 relative to the receiver 32 with the position information being transmitted to the host system 22. Additionally, depression of the buttons 70 and 72 causes a modification of the modulated signal, as also described below, which event is similarly sensed by the receiver 32 for transmission to the host 22.

Figure 8:
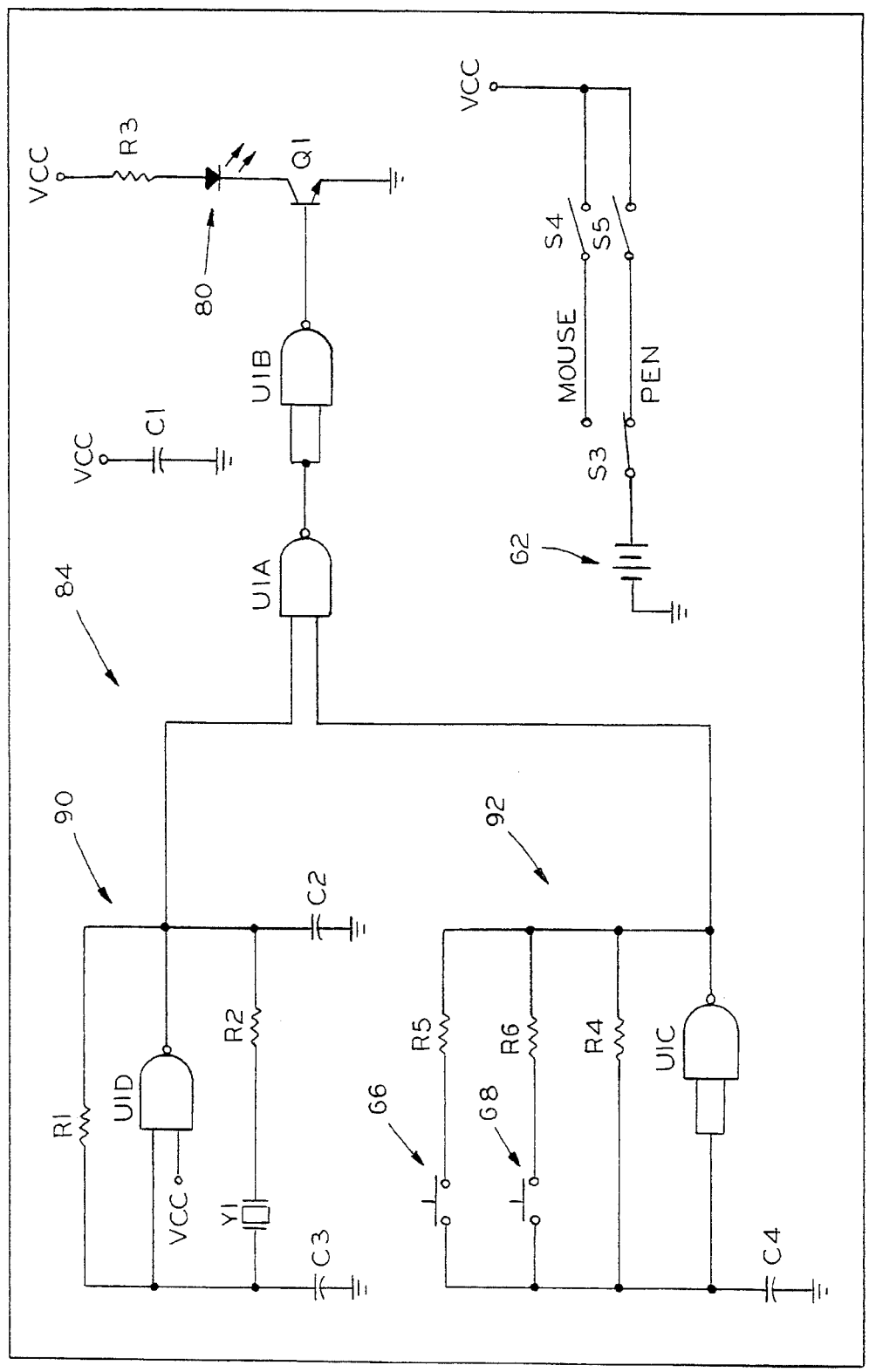
FIG. 8 is a schematic diagram illustrating a transmitter circuit for the pointer of FIG. 4.

With reference to FIG. 8, a schematic diagram illustrates a transmitter circuit 84 on the circuit board 64 in the pointer 36. The pointer 36 is powered by the batteries 62 connected to a selector switch S3. The selector switch S3 is used to select if the pointer 36 is configured to operate as a pen, as discussed above, or a mouse, as discussed below. If configured to operate as a mouse, the switch S3 is connected through a switch S4 to a power node labeled VCC. If selected to operate as a pen, then the switch S3 is connected via a switch S5 to the VCC node. The switches S4 and S5 comprises mercury switches used for disabling the transmitter circuit 84 when the pointer 36 is not in use. Particularly, the switches S4 and S5 open when the pen housing 56 is lifted as by pointing the tip 82 upwardly to turn off the transmitter circuit 84. When the pointer 36 is in a normal, lower than horizontal, position, the switch S5 is closed to provide power from the battery 62 to the VCC node for powering the transmitter circuit 84. The transmitter circuit 84 includes a first oscillating circuit 90 generating an oscillating signal at a first select frequency. A second oscillating circuit 92 generates a second oscillating signal at one of a plurality of different select frequencies.

The first oscillating circuit 90 includes a crystal Y1 connected in series with a resistor R2. The series combination is connected in parallel with a resistor R1 in the feedback path of a NAND gate U1D, also having an input connected to the VCC node. The NAND gate U1D operates as an inverter when power is supplied thereto. The oscillating circuit 90 also includes capacitors C2 and C3. The oscillating circuit 90 generates a fixed frequency signal at the frequency of the crystal Y1, which in the illustrated embodiment is 38 kHz.

The second oscillating circuit 92 includes a NAND gate U1C configured as an inverter having its inputs connected between a capacitor C4 to ground. The feedback for the NAND gate U1C includes a resistor R4, the series combination of the switch 68 and a resistor R6 and the series combination of the switch 66 and a resistor R5. The combination of the resistor R4 and the capacitor C4 with the NAND gate U1C provides an oscillating signal at a frequency related to the time constant represented by the resistance R4 and the capacitor C4. If one of the switches 66 or 68 is closed, as by depressing the respective button 70 or 72, see FIG. 4, the additional resistance of the resistor R5 of R6, respectively, is included in parallel with the resistor R4. The parallel resistance results in a net effective decrease in resistance to decrease the time constant and thus increase frequency of the second oscillator circuit 92. Thus, the second oscillator circuit 92 operates at one of three select frequencies, namely, when neither button 70 or 72 is depressed, when the first button 70 is depressed, or when the second button 72 is depressed.

The outputs of the oscillator circuits 90 and 92 are connected to a NAND gate U1A having its output connected to a NAND gate U1B configured as an inverter. The output of the NAND gate U1B is connected to the base of a transistor Q1. The emitter of the transistor Q1 is connected to ground. The collector of the transistor Q1 is connected through the LED 80 and resistor R3 to the power node VCC. Thus, the transistor Q1 is operable to control illumination of the LED 80.

The circuit as described provides a modulating light signal emanating from the LED 80 at the fixed frequency of the first oscillating circuit 90 with a lower frequency oscillating signal from the second oscillating circuit 92 superimposed thereon. By providing a modulating light signal, the illuminated light from the transmitter 92 can be separated by the receiver 32 from normal ambient light, as discussed below.

In accordance with the invention, the distance between the bicell 42 and quad-cell 44 is selected to be approximately one-sixth the desired distance that the receiver 32 and pointer 36 are to be located from each other in any given application. The bicell 42 collects light from two separate areas on its surface which is converted to a voltage proportionate to the amount of light detected. The quad-cell 44 operates identically to the bicell 42 except for the fact that it consists of four light detecting surfaces, i.e. two bicells located one on top of the other. Because four surfaces are present to return voltages, the quad-cell can determine vertical and horizontal angle.

By using the bicell 42 and one-half of the quad-cell 44, two sets of distinct signals are received, and two angles can be determined. These angles are used to triangulate the two-dimensional position in space of the pointer 36. By using the bicell 42 and quad-cell 44, not only can the two-dimensional position of the transmitter 32 be determined, but the quad-cell 44 is used alone to determine vertical angle of the transmitter 32. The two-dimensional information is mathematically combined with the vertical angle to compute the exact location in three-dimensional coordinate space of the pointer 36 relative to the receiver 32.

Figure 9:
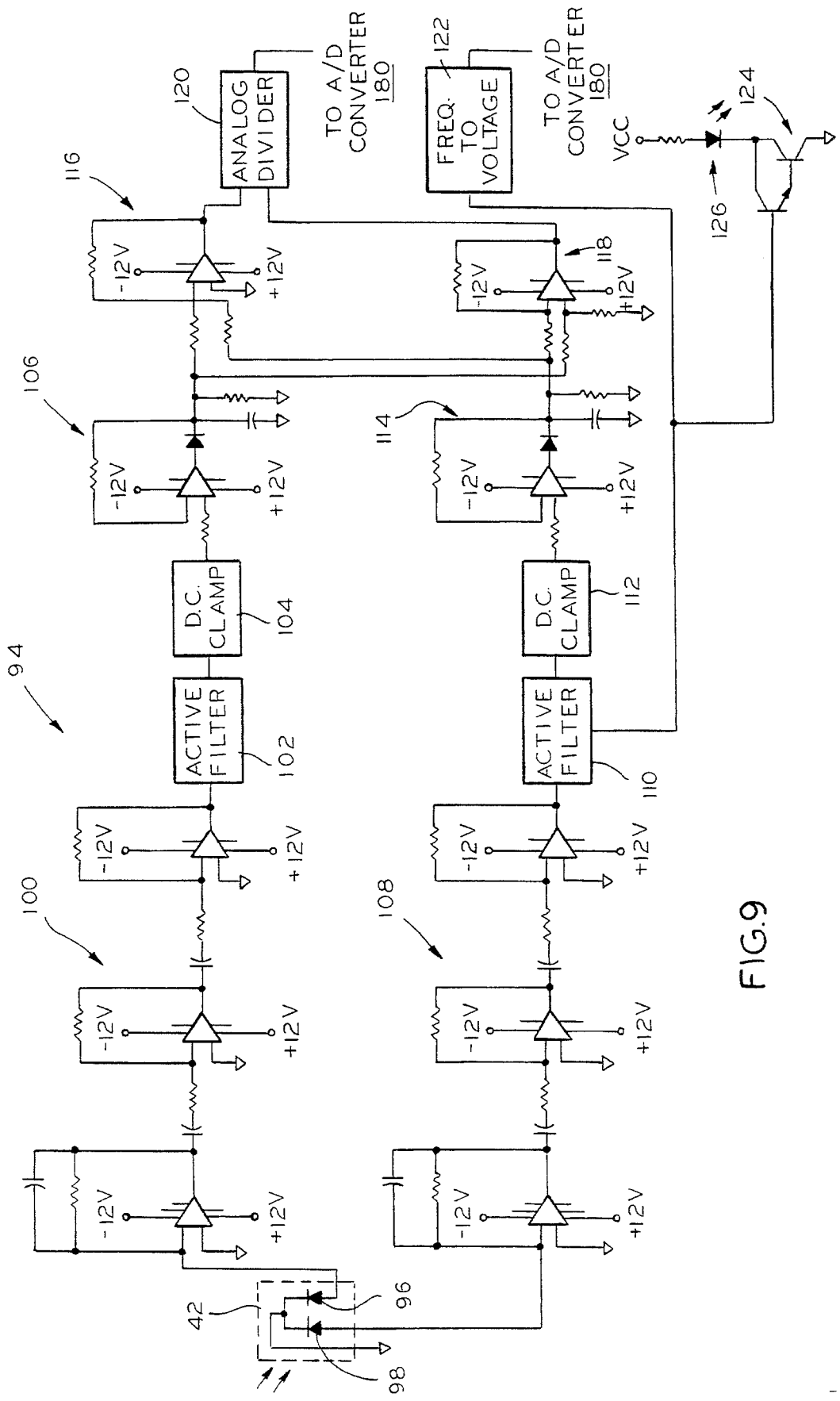
FIG. 9 is a schematic diagram illustrating a receive circuit for a bicell of the receiver of FIG. 2.

With reference to FIG. 9, an electrical schematic for a first receive circuit 94 in the receiver 32 is illustrated. The first receive circuit 94 is associated with and includes the bicell 42 comprising a pair of side by side photodiodes 96 and 98. These diodes develop a current proportional to an amount of light received, which includes light from the transmitter LED 80. As is appreciated, the current through the diodes 96 and 98 is at an extremely low level. The current from the first diode 96 is converted to voltage and amplified in a three stage amplifier circuit 100. The output of the amplifier circuit 100 is connected through an active filter 102 to a DC clamp 104. The active filter passes a signal at the carrier frequency of 38 kHz so the circuit effectively ignores fluorescent or incandescent light. The output of the DC clamp 104 is connected to a peak detector circuit 106, which develops a DC signal proportional to level of light from the LED 80 detected by the first diode 96.

The second diode 98 is connected to a three stage amplifier circuit 108, similar to the circuit 100. The amplifier circuit 108 is in turn connected to an active filter circuit 110, a DC clamp 112, and a peak detector circuit 114. As above, the output of the peak detector circuit 114 is a DC signal having a level proportional to intensity of light received by the second diode 98 from the LED 80. The outputs of both peak detector circuits 106 and 114 are connected to a summing circuit 116 and a difference circuit 118. The summing circuit 116 sums the signals from the circuits 106 and 114. The difference circuit 118 calculates the difference between the outputs from the circuits 106 and 114. The circuits 116 and 118 are both connected to an analog divider 120 which divides the calculated difference by the sum to provide a DC signal proportional to the difference over the sum. This mathematical relationship represents the horizontal angle, see Angle A, FIG. 13, of the pointer 36 relative to the bicell 42.

As discussed above, the pointer 36 transmits two superimposed modulating signals. The main signal is at the carrier frequency of 38 kHz. Superimposed on that is the lower frequency used for indicating which, if any, of the buttons 70 or 72 has been depressed. This main signal when received by the receiver 32 is separated out by the active filter 110, which also includes a low pass filter circuit. The output of the low pass filter circuit is passed to a frequency to voltage converter 122 for developing a voltage proportional to the sensed frequency from the second oscillating circuit 92. This signal is also connected to an NPN Darlington pair transistor 124 for driving an LED 126. The LED 126 modulates with the lower frequency when the receiver is receiving a transmitted signal to indicate the presence of the pointer 36.

Figure 10A:
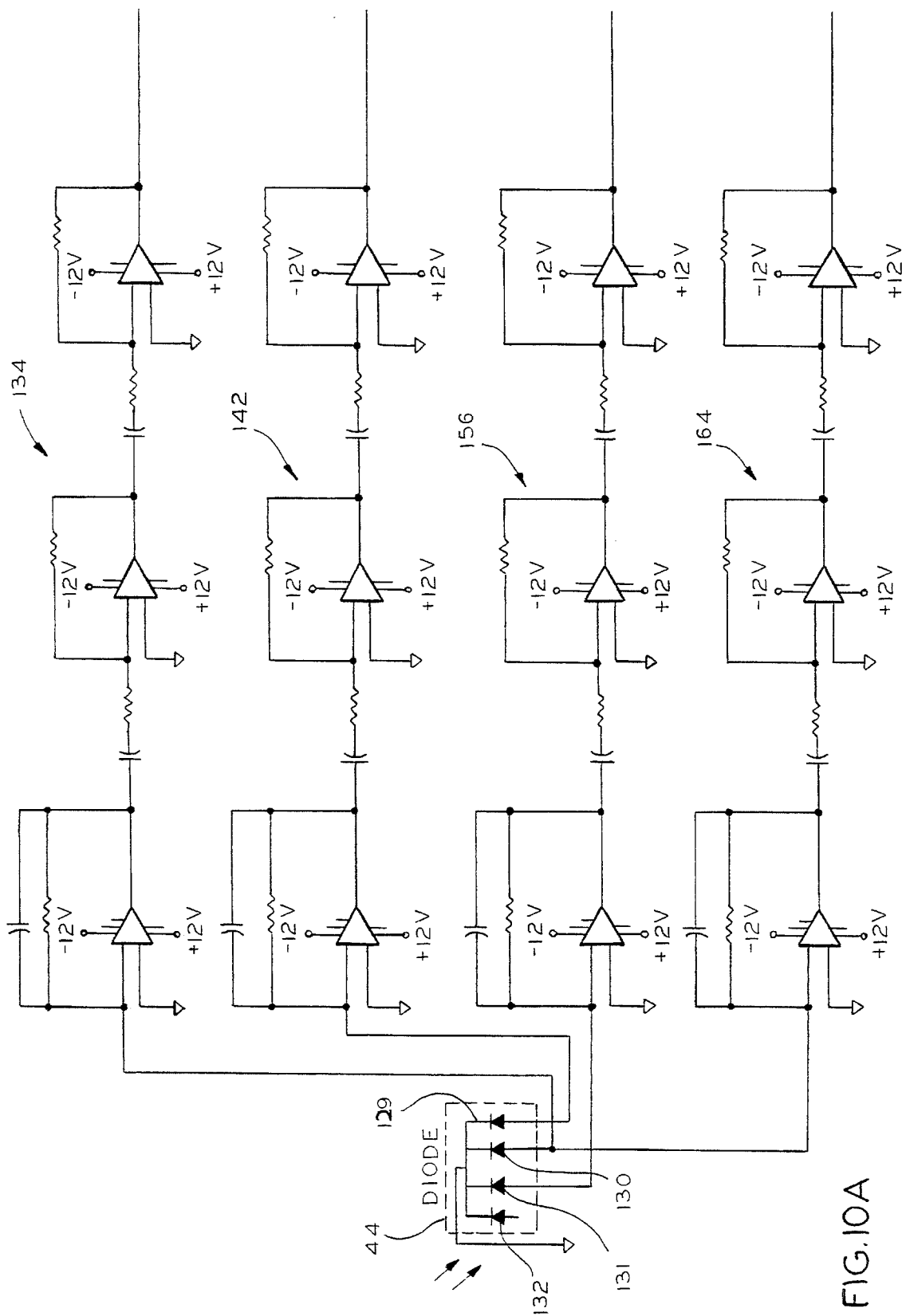
FIG. 10A and 10B are a schematic diagram illustrating a receive circuit for a quad-cell of the receiver of FIG. 2.
Figure 10B:
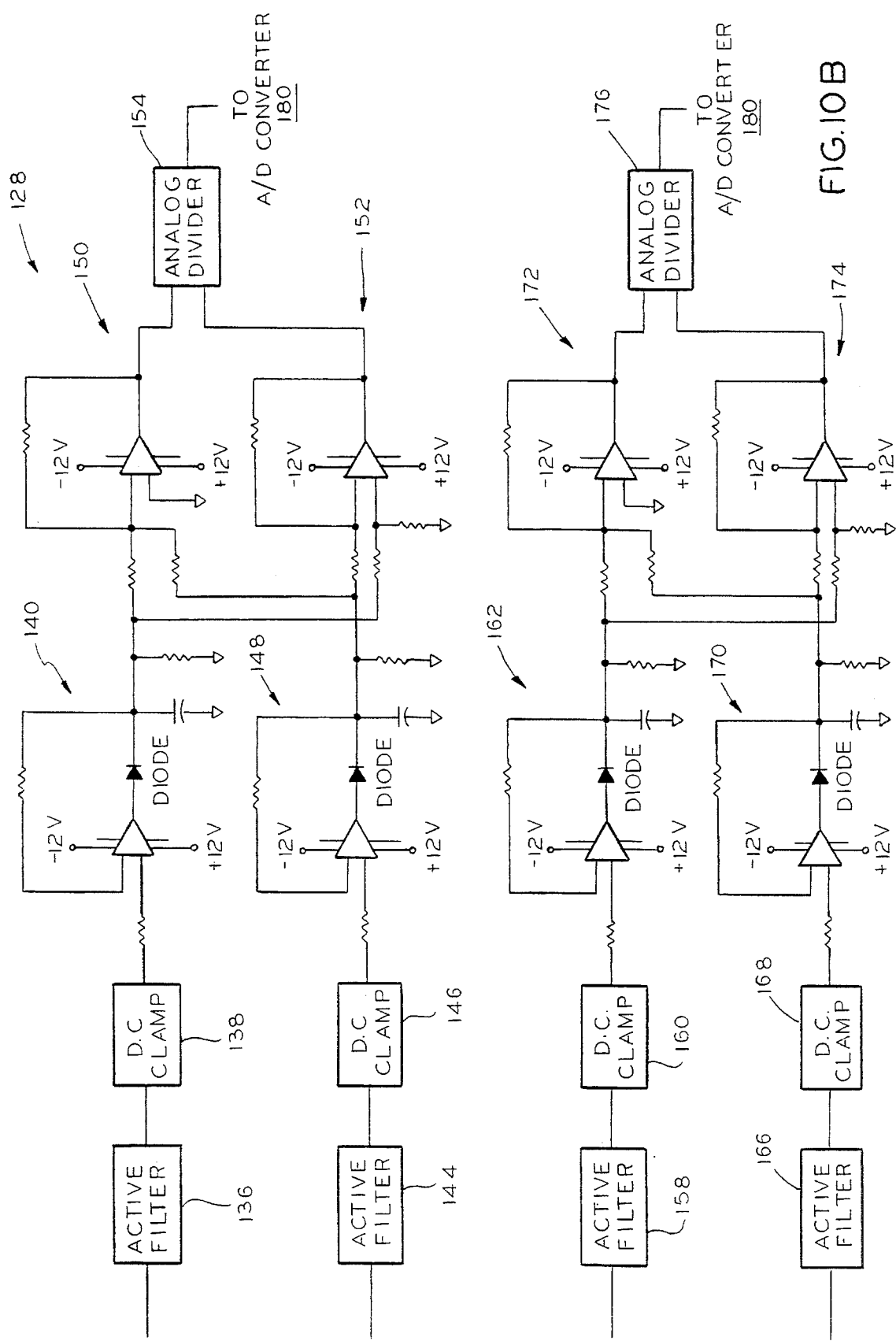

With reference to FIGS. 10A and 10B, a schematic diagram illustrates a second receive circuit 128 which is associated with the quad-cell 44. The second receive circuit 128 is used for determining angular position of the transmitter 132 relative to the quad-cell 44.

The quad-cell 44 includes four photodiodes 129–132. The diode 130 is connected via a three-stage amplifier circuit 134 to an active filter 136 and DC clamp 138 to a peak detector circuit 140. These circuits are all similar to the similarly named circuits discussed above relative to FIG. 9. Similarly, the diode 129 is connected through a three-stage amplifier circuit 142 to an active filter 144 and DC clamp 146 to a peak detector circuit 148. The outputs of the peak detector circuits 140 and 148 are connected to a summing circuit 150 and a difference circuit 152, having outputs connected to an analog divider 154. As above, the analog divider divides the difference of the signals from the detector circuits 140 and 148 by the sum of the same signals to develop an analog signal proportional to the horizontal angle, see Angle B, FIG. 13, of the pointer 36 relative to the quad-cell 44.

In order to determine horizontal angular position, the diodes 129 and 130 of the quad-cell 144 are positioned side by side. The diodes 129 and 130 can be on the top or bottom. Similarly, the diodes 132 and 131 are side by side. In order to measure vertical angle, the second receive circuit 128 must use one of the top diodes and one of bottom diodes. In the illustrated embodiment, the diodes 130 and 131 are used. The diode 131 is connected through a three-stage amplifier circuit 156 to an active filter 158 and a DC clamp 160. The output of the DC clamp is connected to a peak detector circuit 162. The diode 130 is also connected to a three-stage amplifier 164 and through an active filter 166 and DC clamp 168 to a peak detector circuit 170. The peak detector circuits 162 and 170 are connected to a summing circuit 172 and a difference circuit 174, the outputs of which are connected to an analog divider 176. As above, the analog divider divides the difference between the outputs of the detector circuits 162 and 170 by the sum of the same to generate an analog signal representing the vertical angle of the pointer 36 relative to the quad-cell 44.

Figure 11A:
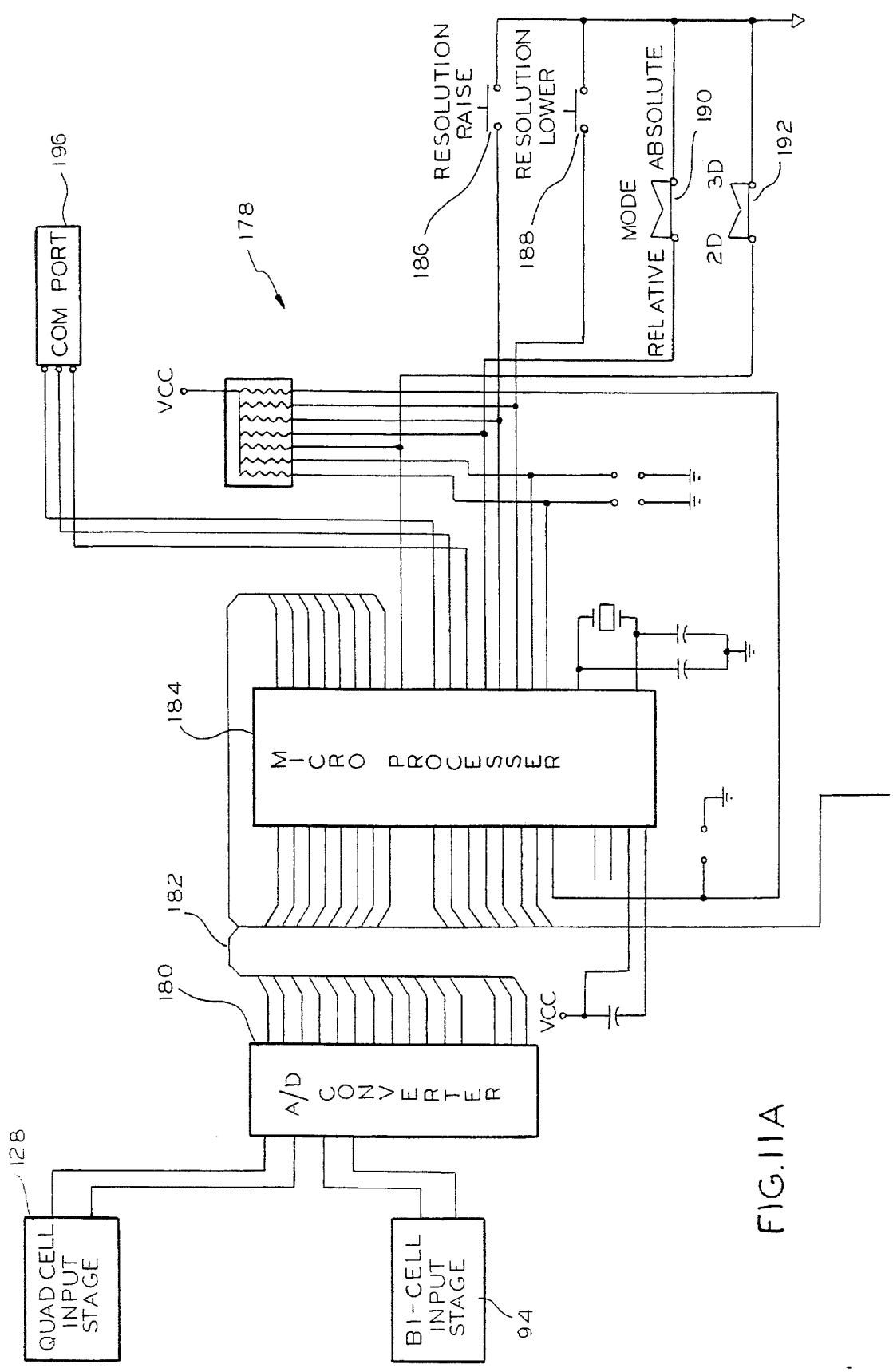
FIG. 11A and 11B are a schematic diagram illustrating a processing circuit of the receiver of FIG. 2.
Figure 11B:
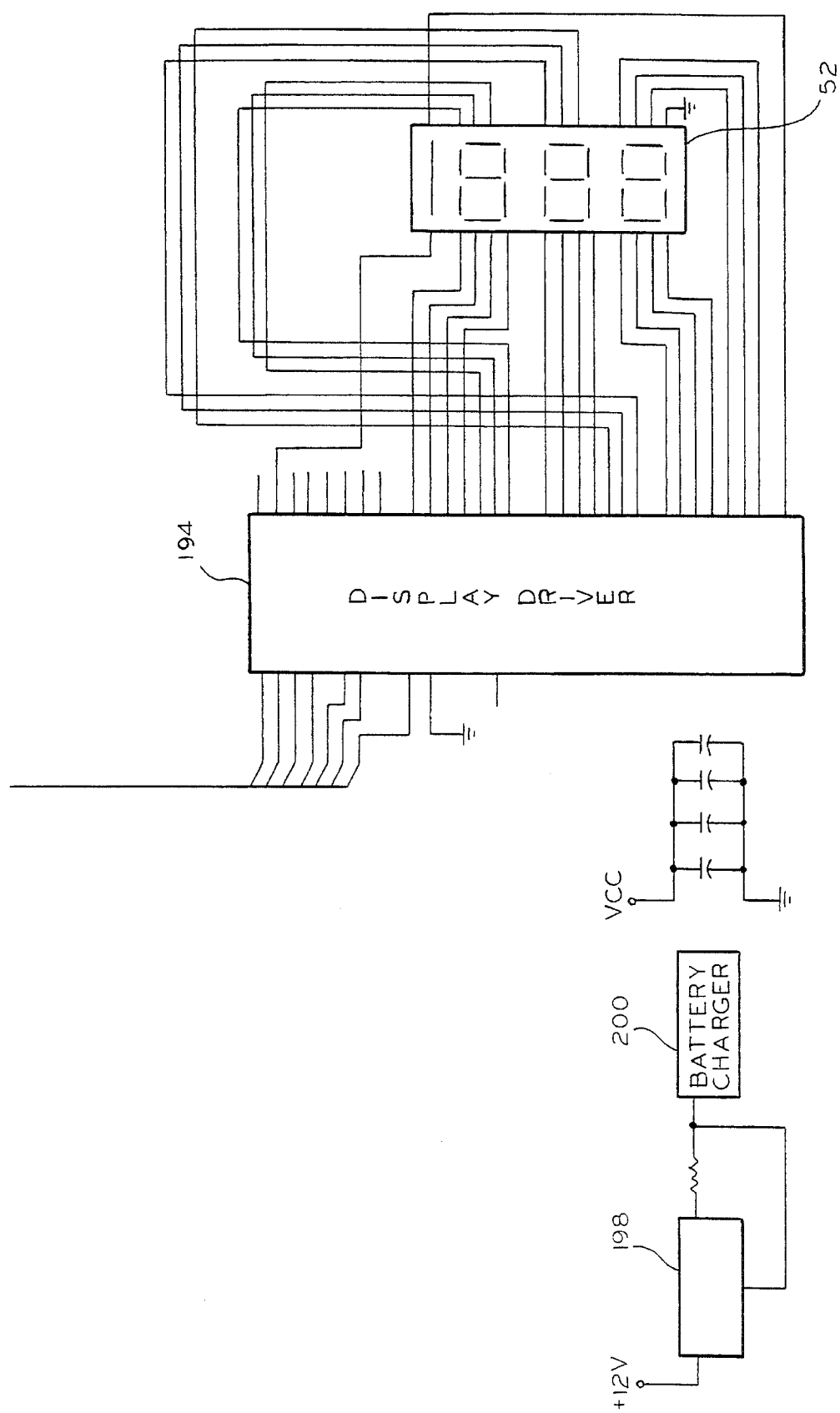

With reference to FIGS. 11A and 11B, a schematic diagram illustrates a processing circuit 178 in the receiver 32. The processing circuit 178 includes a four channel analog multiplexer analog to digital (A/D) converter 180 having sixteen bit resolution. The converter 180 is connected to the first receive circuit 94 and second receive circuit 128. Particularly, the A/D converter 180 receives the analog outputs of the analog dividers 120, 154 and 176 and the frequency to voltage converter 122 for converting these signals to digital signals communicated on a data bus 182 to a microprocessor 184. In the illustrated embodiment of the invention, the microprocessor 184 comprises an 8 bit 8051 chip.

As described, the difference divided by sum calculation is made using an analog circuit. Alternatively, the amplified diode signals could be directly coupled to the A/D converter with the calculation being performed in the microprocessor 184.

The microprocessor 184 is also connected to switches 186 and 188 associated with the resolution selector 50, see FIG. 2, a switch 190 associated with the mode selector 51, and a switch 192 associated with the two dimension/three dimension selector 52. Output ports of the microprocessor 184 are connected via a display driver 194 to the display 48, see FIG. 2. Also, the microprocessor 184 is connected to a communication port 196 providing a conventional serial signal transmitted via the cable 34 to the host system 22, see FIG. 1. Although not shown, a conventional power circuit is included for supplying a voltage regulator 198 connecting to a battery charger 200 which provides power to the charging contacts 46, see FIG. 2. The charging contacts are used to engage corresponding contacts 185 on the pointer 36, see FIG. 4, for recharging the batteries 62.

The microprocessor 184 includes non-modifiable software for processing data from the receive circuits 94 and 128. Particularly, this software is used to mathematically triangulate the position of the pointer 36 relative to the receiver 32.

Figures 12A, 12B:
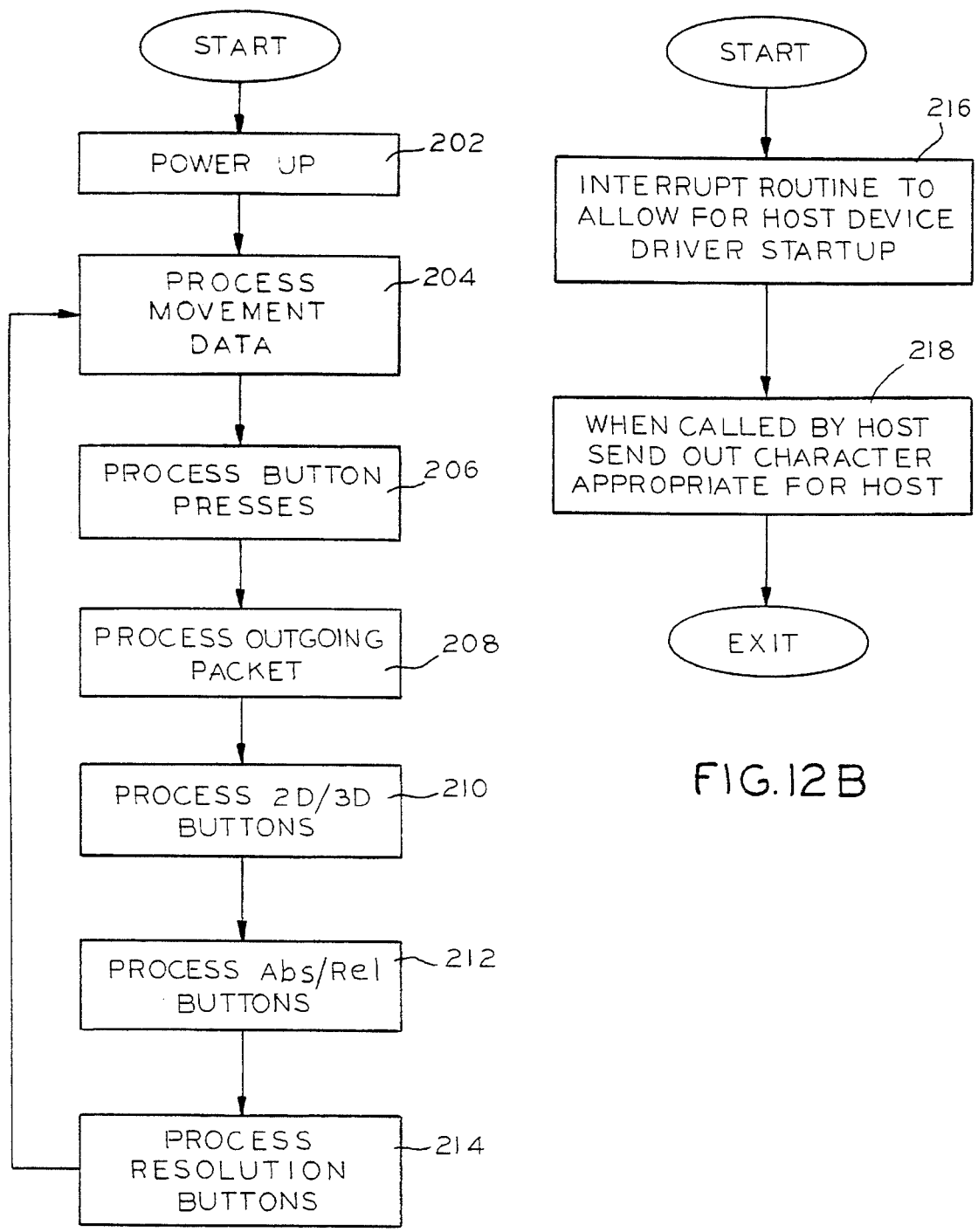
FIGS. 12A–12I comprise a flow chart illustrating a program implemented by the processor of FIG. 11.

With reference to FIGS. 12A–12I, a series of flow charts illustrate operation of the software used by the microprocessor 184 of FIG. 11A for determining position. A main loop is illustrated in FIG. 12A, which at the start implements a power up routine at a block 202. This is followed sequentially by a process movement data routine at a block 204, a process button presses routine at a block 206, a process outgoing packet routine at a block 208, a process 2-D/3-D buttons at a block 210, a process absolute/relative buttons at a block 212, and a process resolution buttons routine at a block 214. The main loop then returns to the block 204. Each of the routines in the main loop is illustrated in greater detail in the remaining flow charts.

With reference to FIG. 12B, when the receiver is first energized, an interrupt routine, prior to the power-up routine at the block 202, is implemented. Particularly, at a block 216 the processor 184 boots up to allow for host device driver startup. The receiver 32 must wait for a suitable host driver program to be operating in the host system 22. As discussed above, this would normally include a mouse driver program of conventional form. The routine waits until this host startup has been completed and at a block 218 a character is transmitted to the host system 22 to indicate availability of the peripheral pointing apparatus 20 to the host system 22. The interrupt routine then ends.

Figure 12C:
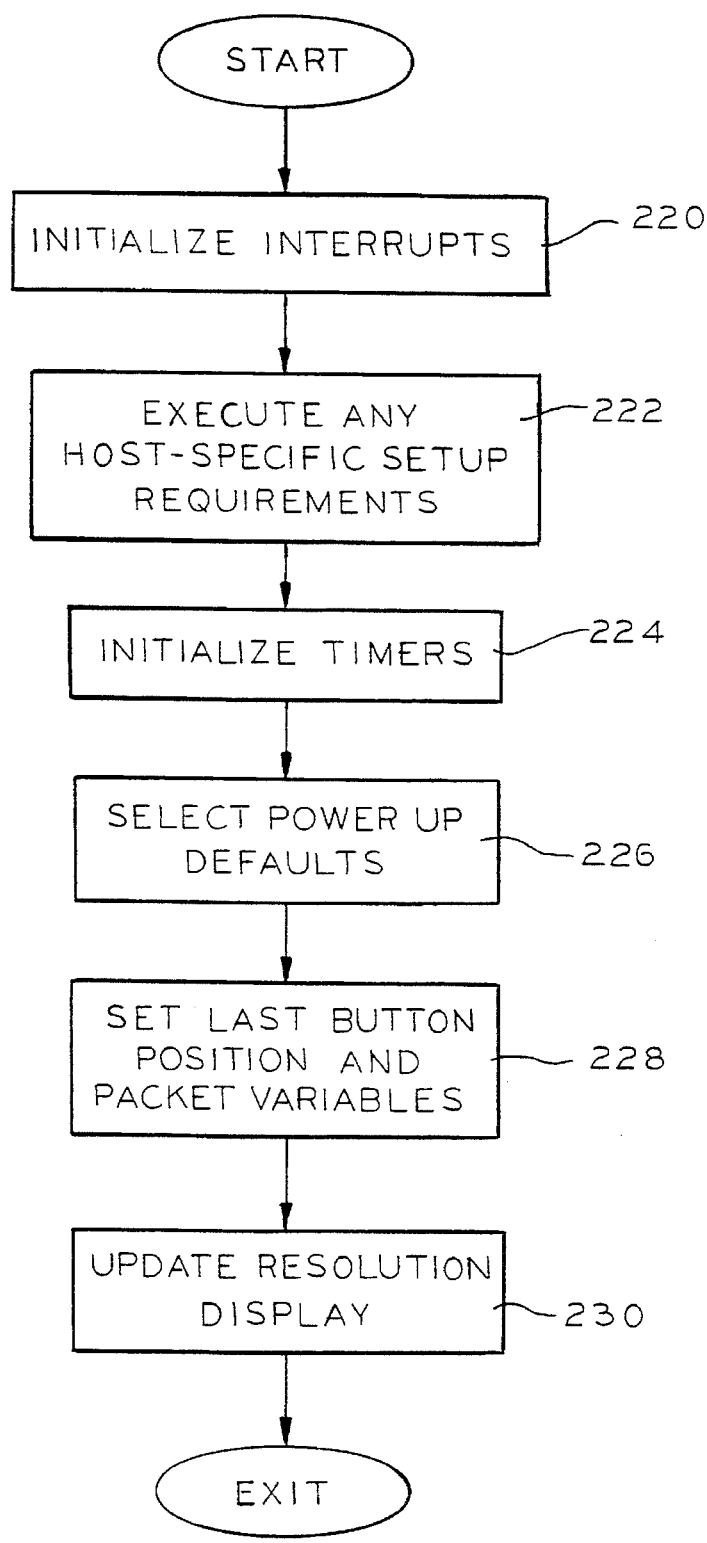

With reference to FIG. 12C, a flow chart for the power-up routine at the block 202 of FIG. 12A is illustrated. This routine begins at a block 220, which initializes interrupts. A block 222 then executes any setup requirements specific to the host system 22 being used. This relates to setting proper format parameters according to the particular requirements of the host system 22. All timers are then initialized at a block 224 and power-up defaults are zeroed at a block 226. At a block 228, predefined last button, position and packet variables are set or cleared for startup and the resolution display 48 is updated at a block 230 to show the default resolution of 300 dots per inch. The routine then ends.

Figure 12D:
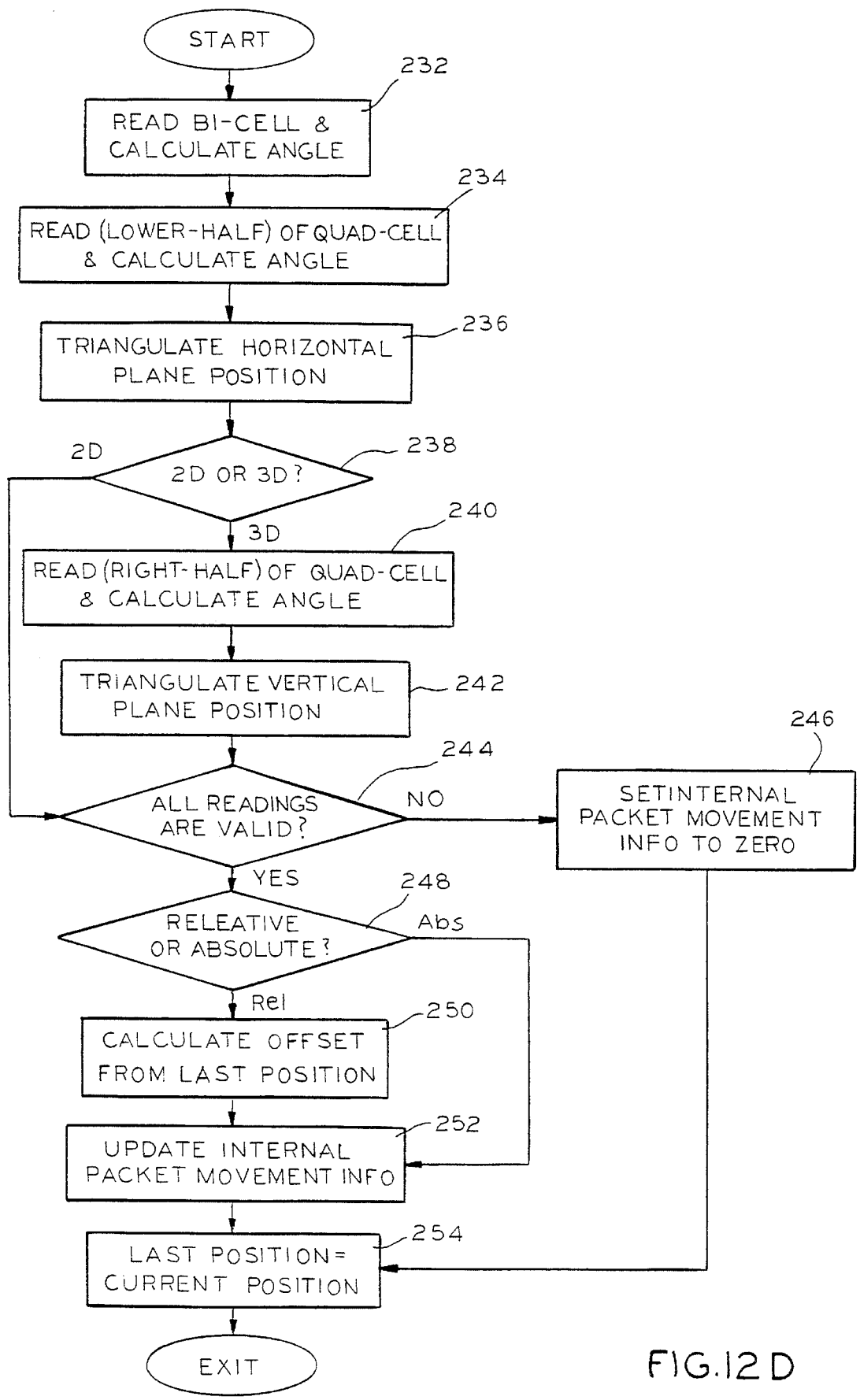

With reference to FIG. 12D, a flow chart illustrates operation of the process movement data routine associated with the block 204 of FIG. 12A. This routine is used for determining position of the pointer 36 relative to the receiver 32.

Figure 13:
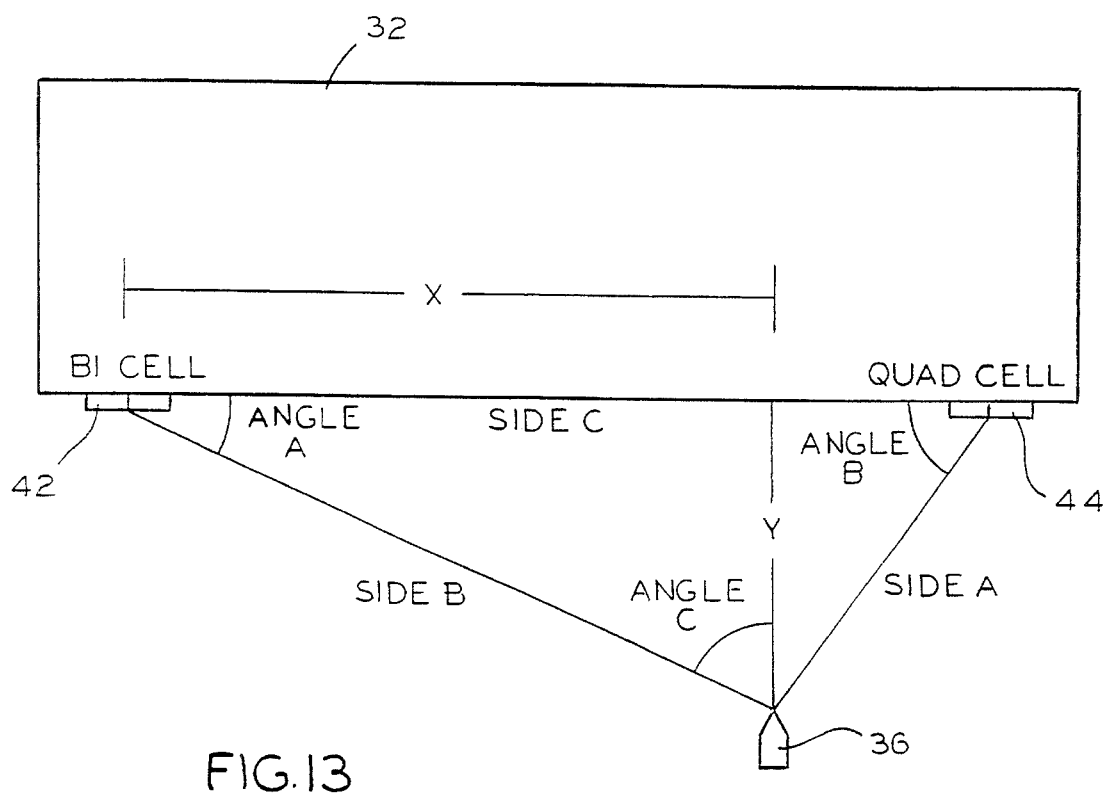
FIG. 13 is a diagrammatic view illustrating the relationship between the transmitter and receiver of the pointing apparatus of FIG. 1.

The routine begins at a block 232 which reads the signal from the bicell and calculates the angle A, see FIG. 13. Particularly, the control reads the signal generated by the first receive circuit analog divider 120. The angle is calculated by converting the digital value from the bicell to an angular value as by multiplying the digital value by 180. At a block 234, the lower half of the quad-cell 44 is read and the angle B is calculated. The lower half of the quad-cell is read from the second receive circuit analog divider 154. The angle B is calculated by multiplying the digital value by 180 and subtracting this result from 180. The horizontal two dimensional coordinate position is then triangulated at a block 236. Particularly, the objective is to calculate the values X and Y, see FIG. 13, to provide a coordinate position for the pointer 36.

With reference also to FIG. 13, the angles A and B are known from the above calculations. The length of side C, the distance between the bicell 42 and the quad-cell 44, is also known. Angle C is determined by subtracting the sum of angles A and B from 180 degrees, as is well known. The three angles A, B and C are then converted to radians. The length of side A is determined by multiplying side C times the sine of angle A in radians divided by the sine of angle C in radians. The length of side B is calculated by multiplying the length of side C by the sine of the angle B in radians divided by the sine of the angle C in radians. The value Y is calculated by multiplying the length of side A times the sine of angle B in radians. The value X is determined by using the Pythagorean theorem, using the length of side B and the value Y. Particularly, the value X equals the square root of side $B^2$ minus $Y^2$. If the angle A is greater than 90, then the value X is multiplied by $-1$. Thus, the coordinate position of the pointer 36 is determined relative to the receiver 32.

A decision block 238 then determines if the button 192 has been operated to select two-dimensional or three-dimensional operation. If three-dimensional, then the right half of the quad-cell 44 is read at a block 240 to calculate the vertical angle. Particularly, this block reads the signal from the second receive circuit analog divider 176 and multiplies it by 180 to obtain an angular value. The vertical plane position is then triangulated at a block 242. Particularly, the vertical angle is known, as is the length of side A, see FIG. 13. This information can be used in a conventional manner, similar to that discussed above, to calculate the vertical position of the pointer 36 relative to the quad-cell 44 so that a three-dimensional coordinate position is obtained.

From the block 242, or if two-dimension is selected at the block 238, then a decision block 244 determines if all readings are valid. The readings would not be valid if the pointer 36 is blocked from one or both of the bicell 42 or quad-cell 44 or if it is out of range. If the readings are not valid, then internal packet movement information is set to zero at a block 246. If the readings are valid, then a decision block 248 determines if the mode button 190 is selected for absolute or relative mode. If absolute mode is selected, then the position is known. If the relative mode is selected, then at a block 250 the offset from the last position is calculated. From the block 250, or if the absolute mode is selected, then an internal packet describing movement information is updated at a block 252, and at a block 254 a value for the last position is then set equal to the current position and the routine ends. This last position information is used at the block 250 during the next implementation of the routine to determine relative position.

Figure 12E:
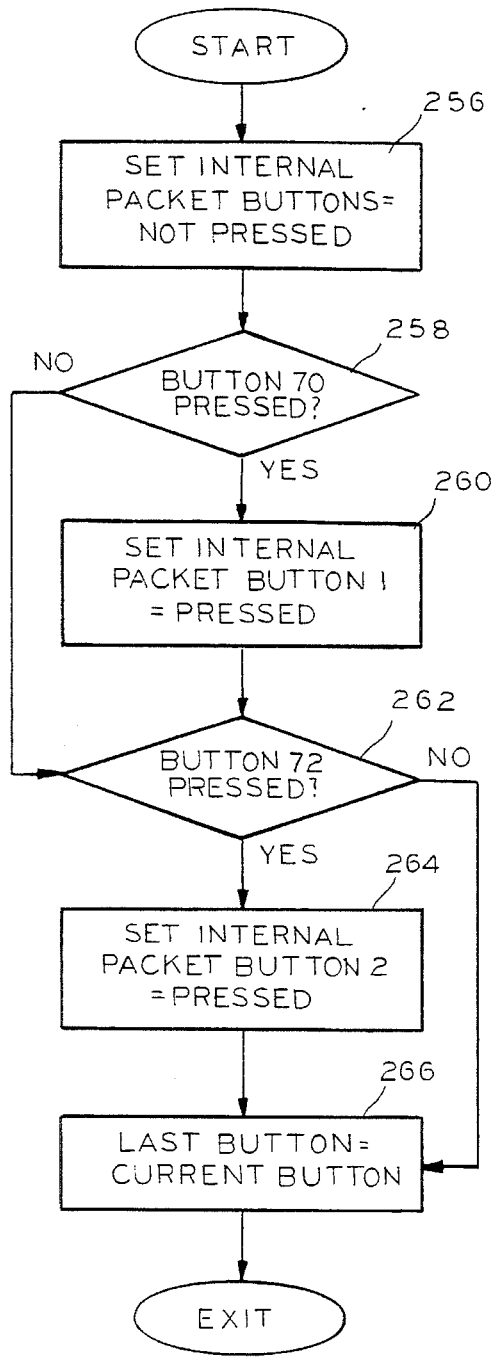

With reference to FIG. 12E, a flow diagram illustrates the process button presses routine of the block 206, see FIG. 12A. This routine begins at a block 256, which sets an internal packet to indicate that no buttons are pressed. A decision block 258 then determines if button 70 is pressed. This determination is made using the voltage level from the frequency voltage converter 122, see FIG. 9. As discussed above, the second oscillator circuit can operate at one of three frequencies. The first frequency is used if no button is pressed, the second frequency is used if the button 70 is pressed and the third frequency is used if the button 72 is pressed. Each of these frequencies is associated with a select reference value stored in the microprocessor 184. If the button 70 is pressed, then the internal packet for button 1 is set to press at a block 260. Thereafter, or if the button 70 is not pressed, then a decision block 262 determines if the button 72 is pressed. If so, then the internal packet for button 2 is set equal to press at a block 264. If button 72 is not pressed, or from block 264, the last button variable is set equal to the current button pressed at a block 266, and the routine ends.

Figure 12F:
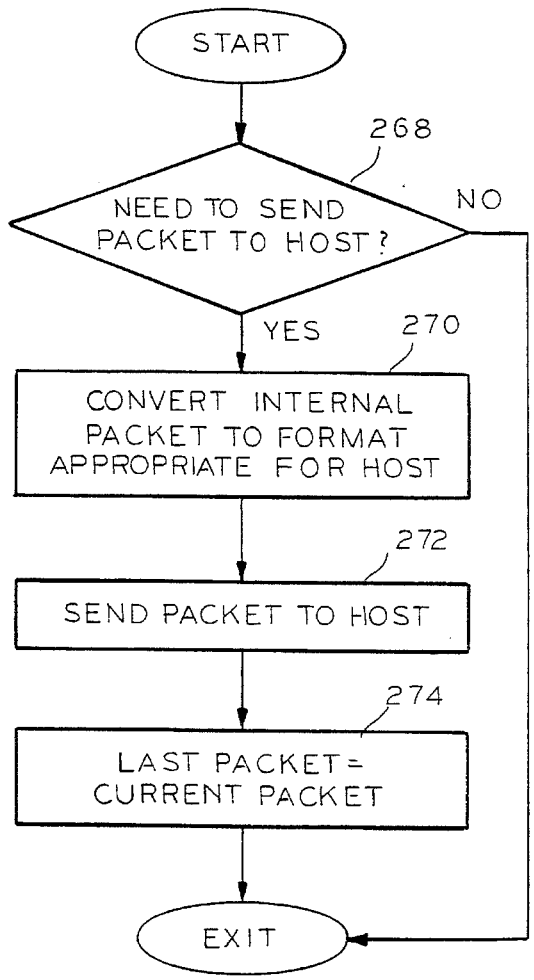

With reference to FIG. 12F, a flow diagram illustrates the process outgoing packets routine of block 208, see FIG. 12A.

This routine begins at a block 268, which determines if it is necessary to send a packet to the host system 22. A packet is sent only if information has changed. If not, then the routine ends. If it is necessary to send a packet, then at a block 270 an internal packet is set to the format appropriate for the host system 22. The packet is then transmitted to the host at a block 272 and at a block 274 a last packet variable is set equal to the current packet variable and the routine then ends. The last packet variable is used at the block 268 in subsequent processing routines to determine if any changes have been made. The transmitted packet includes the last button, position and packet variables discussed above.

Figure 12G:
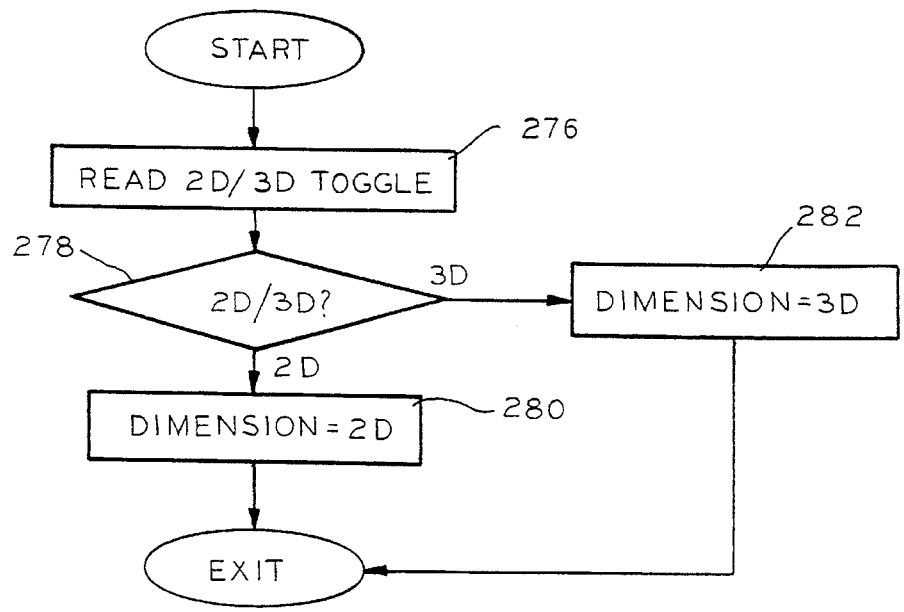

With reference to FIG. 12G, a flow diagram illustrates operation of the process 2-D/3-D buttons of the block 210 of FIG. 12A. This routine begins at a block 276 which reads the position of the 2-D/3-D toggle switch 192. A decision block 278 determines if 2-D or 3-D mode is selected. If 2-D is selected, then a dimension variable is set to 2-D at a block 280, while if 3-D is set, then a dimension variable is set equal to 3-D at a block 282. From either of the blocks 280 or 282, the routine ends.

Figure 12H:
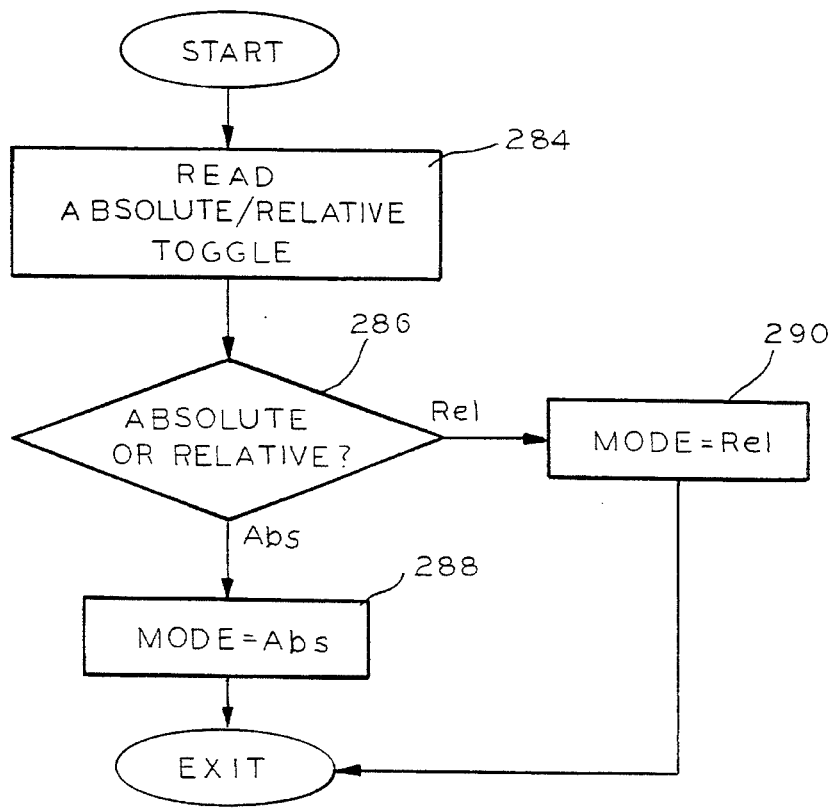
Figure 12:
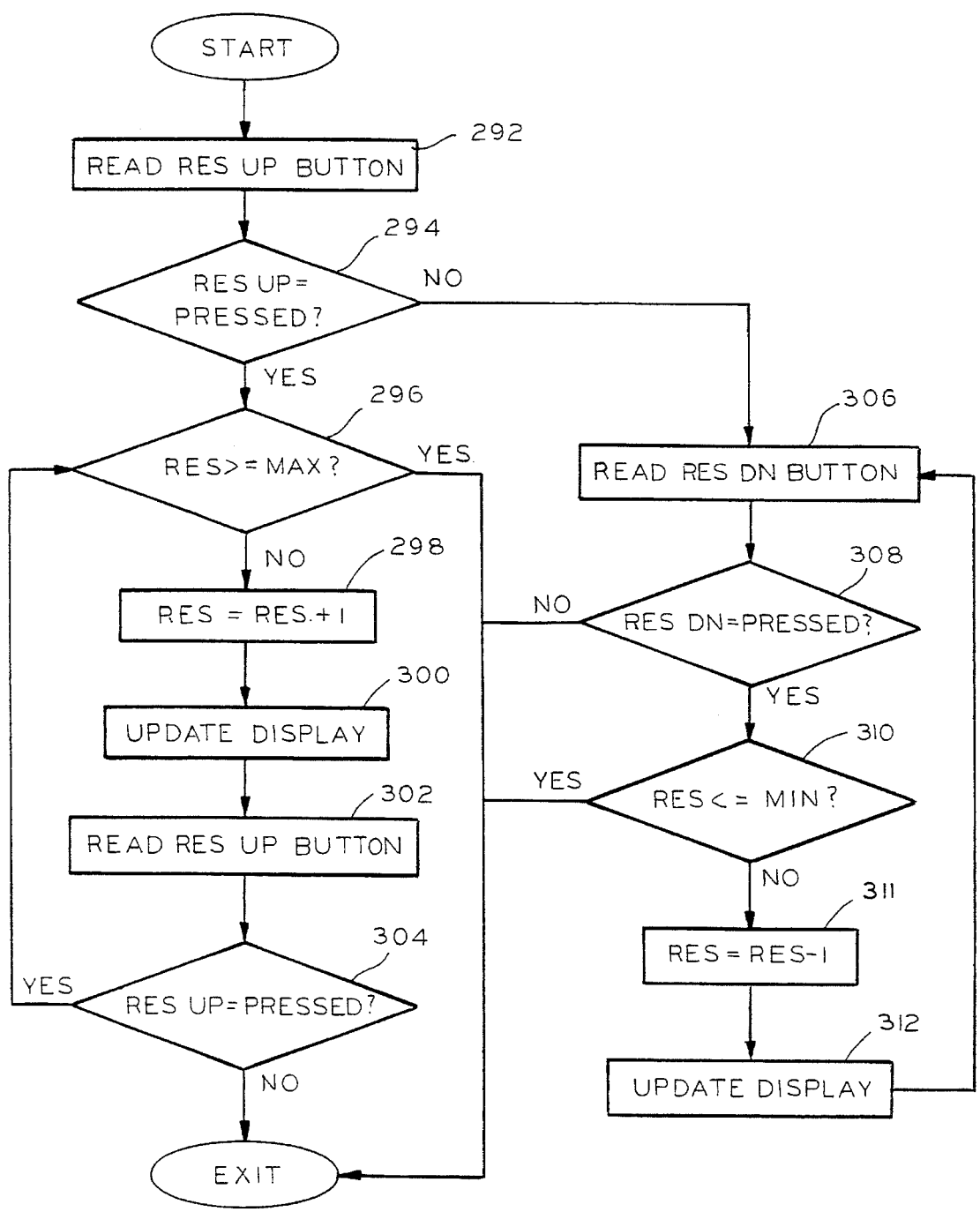

With reference to FIG. 12H, a flow diagram illustrates operation of a process absolute/relative button routine of the block 212, see FIG. 12A. This routine begins at a block 284, which reads the mode toggle switch 190. A decision block 286 determines if the mode is absolute or relative. If absolute, then a mode parameter is set to absolute at a block 288. If relative mode is selected, then the mode variable is set equal to relative at a block 290. From either of the blocks 288 or 290 the routine ends.

With reference to FIG. 12I, a flow diagram illustrates operation of the process resolution buttons of the block 214 of FIG. 12A. This routine is used for updating resolution to be used and sensing movement of the transmitter. This routine uses the switches 186 and 188, see FIG. 11A, for increasing or decreasing resolution.

This routine begins at a block 292, which reads the status of the up resolution button. A decision block 294 determines if the up resolution button is pressed. If so, then a decision block 296 determines if the current resolution is greater than equal to a preselected maximum value. If so, then the routine ends. If not, then the resolution value is incremented by 1 at a block 298 and the display 52 is updated at a block 300. The resolution up button is again read at a block 302 and a decision block 304 determines if it is pressed. If not, then the routine ends. If so, then the control returns to the decision block 296.

If the resolution up button was not depressed, as determined at the decision block 294, then the resolution down button is read at a block 306 and at a decision block 308 a determination is made if the down button is pressed. If not, the routine ends. If so, then the decision block 310 determines is the resolution value is less than or equal to a minimum, and if so, the routine ends. If not, then the resolution value is decremented by 1 at a block 310 and the display is updated at a block 312. The routine then returns to the block 306 to again read status of the resolution down button.

At the completion of the process resolution buttons routine, the main loop returns to the block 204 to again implement the process movement data routine of FIG. 12D, as discussed above. Thus, the system continually updates position of the pointer 36 in either two-dimension or three-dimensional coordinate space and transmits the coordinate position and status of the buttons to the host system in either absolute or relative mode and with information on which of any of the buttons 70 or 72 has been pressed. This information is then used by the host system 22 to control, for example, cursor position or other parameters as necessary or desired.

In the illustrated embodiment, the receiver 32 includes a bicell sensor 42, consisting of a pair of photodiodes 96 and 98, and a quad-cell sensor 44, consisting of four photodiodes 129–132. Alternatively, separate photodiodes could be used at select positions of the housing 40. For example, three photodiodes could be spaced apart in a horizontal line, with the center photodiode being used as a common photodiode, for determining two dimensional position. One or two additional photodiodes, spaced apart in a vertical line, could be used for determining three dimensional position, as discussed above.

Figure 14:
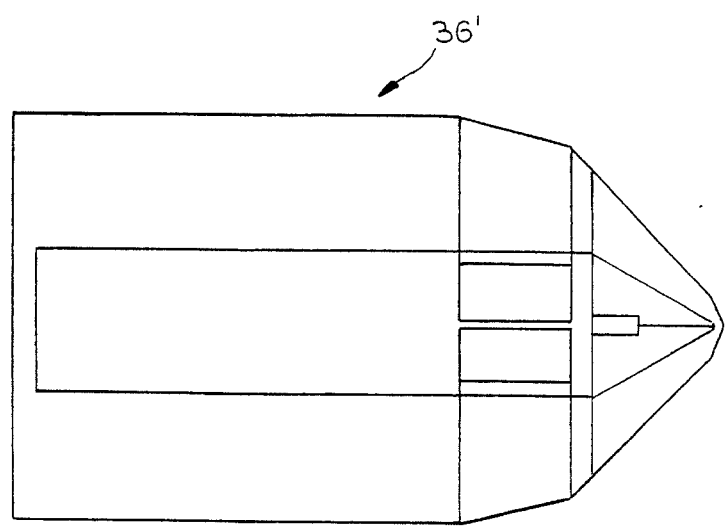
FIG. 14 is a plan view of a pointer according to an alternative embodiment of the invention.

With reference to FIG. 14, a pointer 36' according to an alternative embodiment of the invention is illustrated. The pointer 36' is generally similar to the pointer 36 except that the shape has been modified to be shorter and wider. This is a mouse equivalent version which would be used by sliding the pointer 36' along a flat surface. Suitable bearings or roller elements may be included on the bottom for facilitating sliding movement. The pointer 36' uses the same transmitter circuit as the pointer 36, with the switch S3 being in the mouse position, see FIG. 8. Thus, the pointer 36' is identical in operation to the pointer 36 of FIG. 4.

The described embodiments of the invention illustrate the broad inventive concepts.

We claim:

1. A peripheral pointing apparatus for selecting a desired position for transmission to a processing system, comprising:

a hand-held pointer including a transmitter continually transmitting a through the air signal;

a fixed base unit positioned in proximity to said pointer including a receiver for receiving the through the air transmitted signal, the receiver including spaced apart first and second pairs of photodiodes and a receive circuit connected to said photodiodes, the receive circuit developing a first angle signal representing a first angle of said inter relative to said base unit using said first pair of photodiodes and a second angle signal representing a second angle of said pointer relative to said base unit using said second pair of photodiodes, processing means for processing the first angle signal and the second angle signal to determine position of the pointer relative to the fixed base receiver in response to the received signal, and transmission means for transmitting information representing the determined position to a processing system.

2. The pointing apparatus of claim 1 wherein said transmitter transmits an infrared signal.

3. The pointing apparatus of claim 1 wherein said transmitter transmits a modulating signal.

4. The pointing apparatus of claim 1 wherein said receiver includes two receive circuits each having one of the pairs of photodiodes, the pairs of photodiodes being spaced a select distance apart, each receive circuit including means for determining angle of the pointer relative to its associated pair of photodiodes, and said processing means including calculation means for calculating position of the pointer using the two determined angles and the select distance.

5. The pointing apparatus of claim 4 wherein each said pair of photodiodes comprises a dual cell sensor and each said receive circuit calculates the angle in response to intensity of the signal received at each of said dual cells.

6. A peripheral pointing apparatus for selecting a desired position for transmission to a processing system, comprising:

a hand-held pointer including a transmitter continually transmitting a through the air infra-red light signal;

a fixed receiver positioned in proximity to said pointer and including first and second sensors each receiving the transmitted light signal, the receiver including spaced apart first and second pairs of photodiodes and a receive circuit connected to said photodiodes, the receive circuit developing a first angle signal representing a first angle of said pointer relative to said base unit using said first pair of photodiodes and a second angle signal representing a second angle of said pointer relative to said base unit using said second pair of photodiodes, processing means for processing the first angle signal and the second angle signal to determine a coordinate position of the pointer relative to the fixed receiver, and transmission means for transmitting information representing the determined coordinate position to a processing system.

7. The pointing apparatus of claim 6 wherein said transmitter transmits a modulating signal.

8. The pointing apparatus of claim 6 wherein said transmitter comprises a battery powered transmitter.

9. The pointing apparatus of claim 6 wherein each said pair of photodiodes comprises an associated dual cell light sensor and said receive circuit calculates each angle in response to intensity of the light signal received at each of said dual cells of the associated sensor.

10. The pointing apparatus of claim 9 wherein said receive circuit calculates each angle in response to sum of the intensity of the signals received at said dual cells of the associated sensor divided by a difference in intensity between the intensity of the light signals received at said dual cells.

11. The pointing apparatus of claim 6 further comprising a third pair of photodiodes connected to the receive circuit and said receive circuit calculates angular position of the pointer relative to said third sensor in a plane perpendicular to a plane for the first and second pairs of photodiodes and said processing means in response to said additional angular position calculates a three-dimensional coordinate position of said pointer.

12. The pointing apparatus of claim 6 wherein said pointer further comprises a battery for powering said transmitter and further comprising switch means for selectively connecting said battery to said transmitter.

13. The pointing apparatus of claim 12 further comprising means for sensing angular position of said pointer, said sensing means controlling operation of said switch means to selectively connect said battery to said transmitter according to angular position of said pointer.

14. The pointing apparatus of claim 6 wherein said transmission means comprises a serial interface circuit for transmitting a serial signal to the processing system.

15. A peripheral pointing apparatus for selecting a desired position for transmission to a processing system, comprising:

a hand-held pointer including a transmitter continually transmitting a through the air infra-red modulating light signal;

a fixed receiver positioned in proximity to said pointer and including first and second sensors each receiving the transmitted light signal, the sensors comprising spaced apart first and second pairs of photodiodes and a receive circuit connected to said photodiodes, the receive circuit developing a first angle signal representing a first angle of said pointer relative to said base unit using said first pair of photodiodes and a second angle signal representing a second angle of said pointer relative to said base unit using said second pair of photodiodes, processing means for processing the first angle signal and the second angle signal to determine a coordinate position of the pointer relative to the fixed receiver, and transmission means for transmitting information representing the determined coordinate position to a processing system.

16. The pointing apparatus of claim 15 wherein said pointer further comprises a plurality of user actuable switches and said transmitter comprises a first oscillating circuit generating an oscillating signal at a first frequency, a second oscillating circuit generating a second oscillating signal at one of a plurality of different frequencies, different from said first frequency and dependent upon which if any switch is actuated, and means for combining said first and second oscillating signals for generating said modulating light signal.

17. The pointing apparatus of claim 16 wherein said receive circuit further comprises a separating circuit for separating said first and second oscillating signals and said processing means processes the second oscillating signal to determine which of said switches is actuated.

* * * * *